US007620714B1

(12) United States Patent
Dini et al.

(10) Patent No.: US 7,620,714 B1
(45) Date of Patent: Nov. 17, 2009

(54) METHOD AND APPARATUS FOR MEASURING THE AVAILABILITY OF A NETWORK ELEMENT OR SERVICE

(75) Inventors: Cosmin Dini, San Jose, CA (US); Petre Dini, San Jose, CA (US); Jackson Shyu, Fremont, CA (US); Mark Ammar Rayes, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 929 days.

(21) Appl. No.: 10/714,192

(22) Filed: Nov. 14, 2003

(51) Int. Cl.
*G06F 15/173* (2006.01)
(52) U.S. Cl. ............... 709/224; 709/203; 709/223
(58) Field of Classification Search .......... 709/223, 709/224, 203
See application file for complete search history.

(56) References Cited

U.S. PATENT DOCUMENTS

| 4,070,647 | A | | 1/1978 | Robson |
| 5,341,477 | A | | 8/1994 | Pitkin et al. |
| 5,481,548 | A | | 1/1996 | Wallace |
| 6,003,090 | A | * | 12/1999 | Puranik et al. ............... 709/224 |
| 6,073,089 | A | | 6/2000 | Baker et al. |
| 6,317,775 | B1 | | 11/2001 | Coile et al. |
| 6,496,948 | B1 | * | 12/2002 | Smorodinsky ............... 709/221 |
| 6,629,148 | B1 | | 9/2003 | Ahmed et al. |
| 6,658,473 | B1 | | 12/2003 | Block et al. |
| 6,735,548 | B1 | * | 5/2004 | Huang et al. ................ 709/223 |
| 6,754,854 | B2 | | 6/2004 | Kurrasch |
| 6,785,889 | B1 | | 8/2004 | Williams |
| 6,975,633 | B1 | | 12/2005 | T' Joens |
| 6,996,514 | B2 | * | 2/2006 | Gruber ........................ 703/19 |
| 7,024,580 | B2 | * | 4/2006 | Guimbellot et al. ............ 714/1 |

(Continued)

FOREIGN PATENT DOCUMENTS

| JP | 2000-311130 | 11/2000 |
| JP | 2002-269060 | 9/2002 |
| WO | 2007078643 A3 | 4/2008 |

OTHER PUBLICATIONS

Harold Ascher, et al., "Repairable Systems Reliability, Modeling, Interference, Misconceptions and Their Causes," Lecture Notes in Statistics, vol. 7, 1984, 239 pages.

(Continued)

*Primary Examiner*—Ramy Mohamed Osman
(74) *Attorney, Agent, or Firm*—Hickman Palermo Truong & Becker LLP

(57) ABSTRACT

A method is disclosed for a method for measuring the availability of a network element or service. For each network element N, a current real availability value $CRAV_N$ and a current time value $CTV_N$ are associated with network element N. Additionally, for each network element N, an operational state value $OSV_N$ is associated with network element N. At a later time, indicated by a new time value $NTV_N$, a new real availability value $NRAV_N$ for network element N is determined based on the current availability value $CRAV_N$, the current time value $CTV_N$, the new time value $NTV_N$, and the operational state value $OSV_N$. The new real availability value $NRAV_N$ is stored. Thus, each separate network element N may be associated with a separate real availability value that accurately reflects the availability of network element N specifically, regardless of any availability approximated for network element N's type.

52 Claims, 5 Drawing Sheets

U.S. PATENT DOCUMENTS

| | | | |
|---|---|---|---|
| 7,035,919 B1* | 4/2006 | Lee et al. ............ | 709/223 |
| 7,058,717 B2 | 6/2006 | Chao et al. | |
| 7,145,881 B1 | 12/2006 | Dawes et al. | |
| 7,342,900 B2* | 3/2008 | Xiong et al. ............ | 370/328 |
| 2002/0143960 A1 | 10/2002 | Goren et al. | |
| 2002/0194251 A1 | 12/2002 | Richter et al. | |
| 2003/0005023 A1 | 1/2003 | Gilbert et al. | |
| 2003/0112948 A1 | 6/2003 | Brown et al. | |
| 2003/0158940 A1 | 8/2003 | Leigh | |
| 2003/0187967 A1 | 10/2003 | Walsh et al. | |
| 2004/0008724 A1 | 1/2004 | Devine et al. | |
| 2004/0064583 A1 | 4/2004 | Dani et al. | |
| 2004/0215761 A1 | 10/2004 | Fujii et al. | |
| 2004/0221191 A1 | 11/2004 | Porras et al. | |
| 2005/0015504 A1 | 1/2005 | Dorne et al. | |
| 2005/0027862 A1 | 2/2005 | Nguyen et al. | |
| 2005/0152308 A1 | 7/2005 | Seol et al. | |
| 2005/0207380 A1 | 9/2005 | Blasco Claret et al. | |
| 2006/0075275 A1 | 4/2006 | Dini et al. | |
| 2006/0106938 A1 | 5/2006 | Dini et al. | |
| 2006/0165052 A1 | 7/2006 | Dini et al. | |

OTHER PUBLICATIONS

Alain Pages, et al., "System Reliability Evaluation & Prediction in Engineering," 1986, 367 pages.

Dr. Sidnie Feit, SNMP, A Guide to Network Management, McGraw-Hill, Inc., 1995, 702 pages.

Johnson, Barry W., "Design and Analysis of Fault Tolerant Digital Systems", Addison-Wesley Publishing Co., 1989, 7 pages.

B. Giffo-Schmitt, International Preliminary Report on Patentability, published by WIPO, Geneva, Switzerland, Jul. 1, 2008, 5 pages.

L. W. Young, Written Opinion of the International Searching Authority, published by USPTO, Alexandria, Virginia, Mar. 11, 2008, 4 pages.

Dongarra, "Three tools to help with cluster and grid computing: SANS-Effort, PAPI, and NetSolve", Proceedings CCGRID 2002, $2^{nd}$ IEEE/ACM International Symposium on Cluster Computing and the Grid, 2002, 11 pages.

* cited by examiner

METHOD AND APPARATUS FOR MEASURING THE AVAILABILITY OF A NETWORK ELEMENT OR SERVICE

FIELD OF THE INVENTION

The present invention generally relates to the analysis of network elements and services. The invention relates more specifically to a method and apparatus for measuring the availability of a network element or a service.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computer networks typically are comprised of multiple network elements, such as routers, that communicate data to each other. Working together or individually, network elements may provide various services. For example, several routers working together may provide a voice-over-IP service.

The quality of network elements or services may be measured according to various metrics. One metric used to measure the quality of network elements and services is the availability metric. To simplify the discussion below, availability is discussed in the context of network elements. However, the following references to the availability of network elements apply equivalently any other kind of computing element, and to services.

At least in theory, a network element's availability with respect to a given time period should reflect the fraction of that time period that the network element was at least partially operational. The availability metric theoretically could be used for many different purposes. For example, if obtained accurately, the availability metric might be used to perform availability-based routing. Given multiple network routes between a specified source and a specified destination, availability-based routing would seek to determine and use the route that contains network elements having the highest aggregate availability.

Unfortunately, current approaches for measuring availability do not lend themselves well to practical use. This is largely because such current approaches usually approximate only the availability of types of network elements generally. In the real world, the actual availability of a specific network element can vary greatly from the availability approximated relative to that network element's type. The inaccuracy resulting from current approaches disables practical applications that require greater precision, such as, for example, availability-based routing.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for measuring the availability of a network element or service is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| 1.0 | General Overview |
| 2.0 | Structural and Functional Overview |
| 3.0 | Implementation Example |
| 4.0 | Implementation Mechanisms—Hardware Overview |
| 5.0 | Extensions and Alternatives |

1.0 General Overview

The needs identified in the foregoing Background, and other needs and objects that will become apparent for the following description, are achieved in the present invention, which comprises, in one aspect, a method for measuring the availability of a network element or service. For each network element N, a current real availability value $CRAV_N$ and a current time value $CTV_N$ are associated with network element N.

Additionally, for each network element N, an operational state value $OSV_N$ is associated with network element N. A particular network element's operational state value indicates whether the particular network element is in an enabled or disabled state.

At a later time, indicated by a new time value $NTV_N$, a new real availability value $NRAV_N$ for network element N is determined based on the current availability value $CRAV_N$, the current time value $CTV_N$, the new time value $NTV_N$, and the operational state value $OSV_N$. The new real availability value $NRAV_N$ is stored. Thus, each separate network element N may be associated with a separate real availability value that accurately reflects the availability of network element N specifically, regardless of any availability approximated for network element N's type.

According to one embodiment, whenever a new real availability value $NRAV_N$ is determined, the current availability value $CRAV_N$ is set equal to the new real availability value $NRAV_N$, and the current time value $CTV_N$ is set equal to the new time value $NTV_N$. The operational state value $OSV_N$ is updated in response to network element N changing from an enabled state to a disabled state, or vice-versa. Thus, the foregoing steps may be repeated in a recursive manner at any time to determine and store, instantaneously, a current real availability value that accurately indicates the availability of network element N at that time.

In other aspects, the invention encompasses a computer apparatus and a computer-readable medium configured to carry out the foregoing steps.

2.0 Structural and Functional Overview

Figure 1:
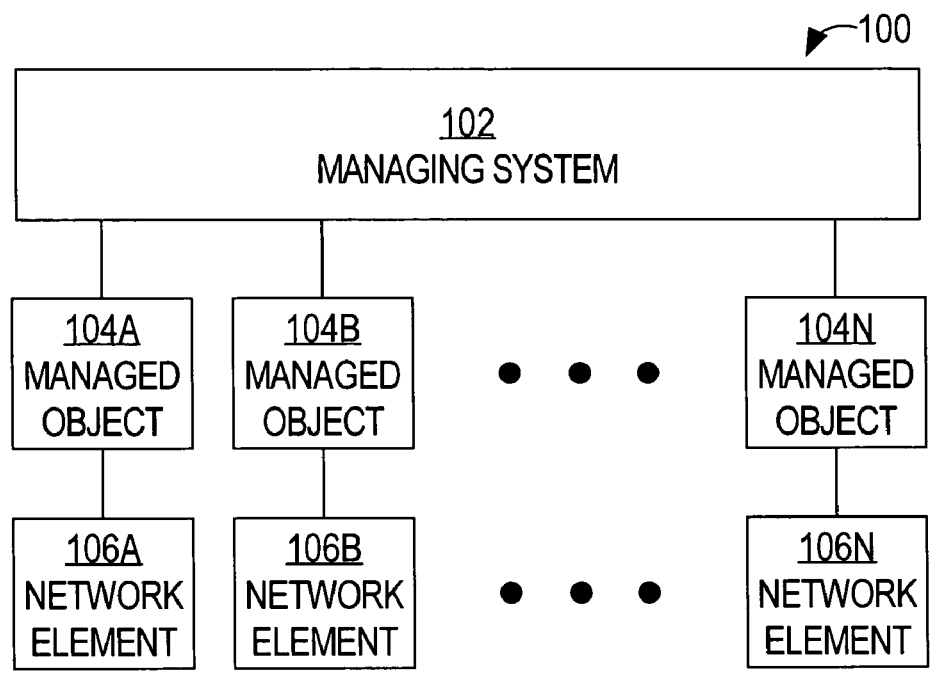
FIG. 1 is a block diagram that illustrates an overview of a system in which network elements are represented by managed objects.

FIG. 1 is a block diagram that illustrates an overview of a system in which network elements are abstracted by managed objects. System 100 comprises a managing system 102, managed objects 104A-N, and network elements 106A-N. Through managed objects 104A-N, managing system 102 sends commands to, and receives responses from, network elements 106A-106N. For each of managed objects 104A-N, there is a separate corresponding one of network elements 106A-N. A managed object may correspond to a service rather than a network element, but for sake of simplicity, system 100 shows only managed objects that correspond to network elements.

Each of managed objects 104A-N abstractly represents the managed object's corresponding network element. Each such managed object comprises attributes that represent aspects of the corresponding network element. For example, managed object 104A may comprise an "operationalState" attribute that indicates the operational state of network element 106A—whether network element 106A is in an enabled or disabled state. When the operational state of network element 106A changes, network element 106A updates the "operationalState" attribute of managed object 104A. Managing system 102 can read the "operationalState" attribute of managed object 104A in order to determine the operational state of network element 106A.

Managed objects 104A-N are not objects in the physical sense. Instead, managed objects comprise data that may be stored, for example, in a management repository. One example of a management repository is a Management Information Base (MIB). Managed objects 104A-N may be implemented in an object-oriented programming environment Each of network elements 106A-106N may comprise one or more programmatic agents that receive commands and send events. For example, an agent may be a Simple Network Management Protocol (SNMP) agent that communicates with an SNMP management station included in managing system 102. For more information on the SNMP MIB, reference may be made to the Internet Engineering Task Force (IETF) Request For Comments (RFC) 1213. Other examples of agents include Syslog agents and Transaction Language 1 (TL1) agents.

Network elements 106A-N may be any devices that communicate data in a computer network. For example, network elements 106A-N may be routers. Depending on the configuration of the computer network in which they are located, various ones of network elements 106A-N may be able to communicate with each other.

Figure 2:
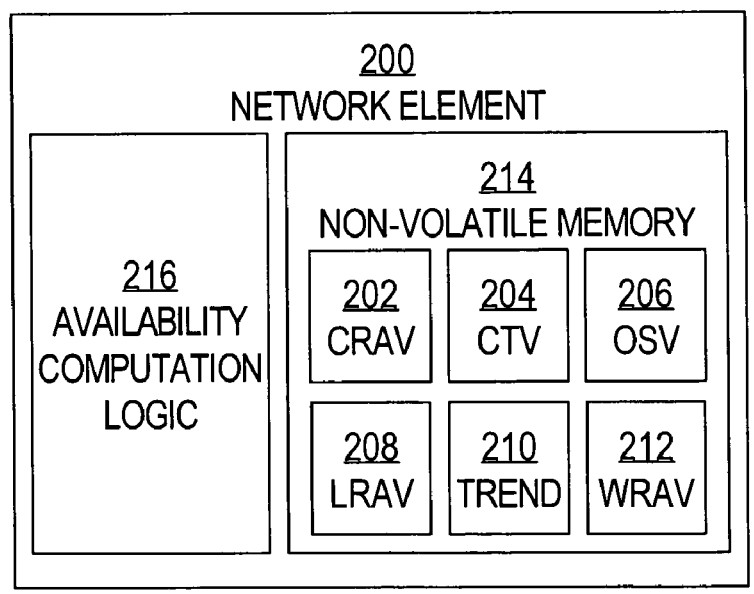
FIG. 2 is a block diagram that illustrates an overview of a network element.

FIG. 2 is a block diagram that illustrates an overview of a network element. Network element 200 is representative of each of network elements 106A-N. Network element 200 comprises a non-volatile memory 214 that stores information. Because memory 214 is non-volatile, information stored in the non-volatile memory is not lost even if network element 200 loses power. Network element 200 further comprises availability computation logic 216 for determining, according to techniques described herein, the values stored in non-volatile memory 214.

Within non-volatile memory 214, network element 200 stores a current real availability value (CRAV) 202, a current time value (CTV) 204, an operational state value (OSV) 206, a lowest recorded real availability value (LRAV) 208, a trend indicator 210, and a weighted real availability value (WRAV) 212. These values pertain only to the particular network element that stores the values. Thus, each of network elements 106A-N stores its own separate set of values.

CRAV 202 indicates, as of the most recent update of CRAV 202, the fraction of time that network element 200 has been in an enabled state since network element 200 was initialized. Initially, CRAV 202 is set equal to "1," indicating that network element 200 has never been in a disabled state since the network element was initialized. Enabled and disabled states are discussed in greater detail below with reference to FIG. 3.

CTV 204 indicates the amount of time that has passed between the initialization of network element 200 and the moment at which CRAV 202 was most recently updated. Thus, whenever CRAV 202 is updated, CTV 204 is updated accordingly. Initially, CTV 204 is set equal to "0," indicating that no time has passed between the initialization of network element 200 and the moment at which CRAV 202 was last updated. To determine CTV 204, for example, a timestamp may be stored when network element 200 is initialized. Then, when CRAV 202 is updated, CTV 204 may be determined by calculating the difference between the stored timestamp and the current time.

OSV 206 indicates whether network element 200 is in an enabled state or a disabled state. If network element 200 is in an enabled state, then OSV 206 equals "1," or another unique flag value. Alternatively, if network element 200 is in a disabled state, then OSV 206 equals "0," or another unique flag value.

LRAV 208 indicates the lowest CRAV that has been measured since network element 200 was initialized. Whenever CRAV 202 is updated, the CRAV is compared to LRAV 208. If CRAV 202 is lower than LRAV 208, then the LRAV is set equal to the CRAV.

Trend indicator 210 indicates whether the availability of network element 200 was ascendant, descendant, or stable (neither ascendant nor descendant) between the times of the two most recent updates of CRAV 202. Whenever CRAV 202 is updated, trend indicator 210 is updated as well.

WRAV 212 is an indicator similar to CRAV 202, except that the WRAV is determined in a manner that gives more weight, or magnitude, to more recently determined values. In contrast, the CRAV is determined in a manner that does not weight values based on the relative recentness of those values. Techniques for determining CTV 202 and WRAV 212 are discussed in greater detail below with reference to FIG. 5.

Each of the values described above, when updated in the non-volatile memory of the network element to which those values pertain, may also be updated in the managed object that corresponds to the network element. Thus, managing system 102 may read current real availability values for each of network elements 106A-N by referring to the corresponding ones of managed objects 104A-N. Alternatively, managing system 102 may obtain current real availability values by sending a request in a management protocol, such as SNMP, or through a programmatic interface.

Therefore, each separate network element is associated with a separate real availability value that may be updated instantly and obtained and used by management applications. As a result, applications such as availability-based routing, which require current, accurate, network element-specific availability metrics, are enabled.

In one embodiment, the current state of network element 200 may be, at any given moment, one of several defined states. When the current state of network element 200 is a particular defined state, the network element may be said to be "in" the particular defined state. Events detected by network element 200 may cause the network element to transition from one such defined state to another.

Events may be classified broadly into two major categories: "operational" events and "management" events. Management events occur in response to commands sent from outside network element 200. For example, a management event would occur in response to managing system 102 sending, to network element 200, a command instructing the network element to shut down. In contrast, operational events do not occur in response to commands sent from outside network element 200. For example, an operational event would occur in response to one or more components of network element 200 experiencing a failure.

To maintain accuracy, a network element's availability should be influenced by state changes resulting from operational events, but a network element's availability should not be affected by state changes resulting from management events. For example, if a network element becomes non-operational as a result of being shut down purposefully, then the time period during which the network element is non-operational should be ignored when determining the network element's availability, because that time period does not truly reflect upon the network element's inherent availability tendencies. If not for being shut down purposefully, the network element might have remained operational during the entire period that the network element was not operational.

Figure 3:
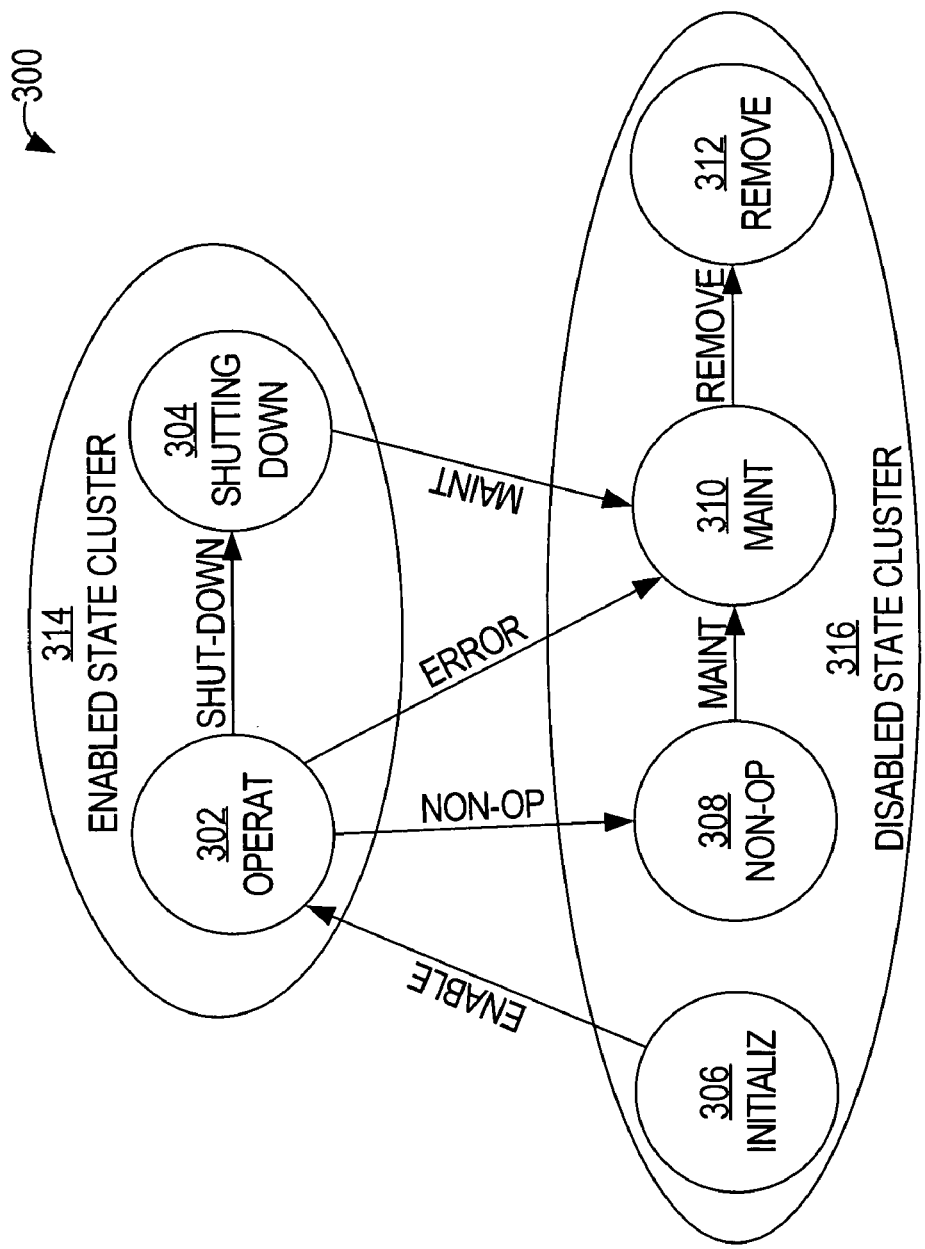
FIG. 3 is a state diagram that illustrates enabled and disabled state clusters.

FIG. 3 is a state diagram that illustrates enabled and disabled state clusters. State machine 300 comprises defined states 302-312. Among these defined states are an "operat" state 302, a "shutting down" state 304, an "initializ" state 306, a "non-op" state 308, a "maint" state 310, and a "remove" state 312. Defined states 302-312 are distributed among an enabled state cluster 314 and a disabled state cluster 316.

Enabled state cluster 314 comprises "operat" state 302 and "shutting down" state 304, referred to collectively as "enabled" states. The enabled states are included in enabled state cluster 314 because, when network element 200 is in either of the enabled states, the network element should be considered to be "available."

Disabled state cluster 316 comprises "initializ" state 306, "non-op" state 308, "maint" state 310, and "remove" state 312, referred to collectively as "disabled" states. The disabled states are included in enabled state cluster 314 because, when network element 200 is in any of the disabled states, the network element should be considered to be "unavailable."

As shown in FIG. 3, various events can cause network element 200 to transition from one defined state to another. If an "enable" event is detected while network element 200 is in "initializ" state 306, then the network element transitions from "initializ" state 306 to "operat" state 302. If a "non-op" event is detected while network element 200 is in "operat" state 302, then the network element transitions from "operat" state 302 to "non-op" state 308. If an "error" event is detected while network element 200 is in "operat" state 306, then the network element transitions from "operat" state 302 to "maint" state 310. If a "shut-down" event is detected while network element 200 is in "operat" state 302, then the network element transitions from "operat" state 302 to "shutting down" state 304. If a "remove" event is detected while network element 200 is in "maint" state 310, then the network element transitions from "maint" state 310 to "remove" state 312. If a "maint" event is detected while network element 200 is in "non-op" state 306 or "shutting down" state 304, then the network element transitions from the network element's current state to "maint" state 310.

Defined states 302-312 are distributed among state clusters 314 and 316 in such a way that operational events may cause a transition between defined states in different state clusters, but management events such as "shut-down" only cause transitions between states in the same state cluster. Therefore, network element 200 does not transition between enabled and disabled states in response to management events.

As is described in greater detail below, real availability values are determined based at least in part on OSV 206, which indicates whether a network element is in an enabled state or a disabled state. Therefore, by preventing management events from causing transitions between enabled and disabled states, real availability values are not tainted by events that do not truly reflect upon a network element's innate availability tendencies.

In one embodiment, real availability values are determined either in response to events that cause a transition between enabled and disabled states, or in response to commands to determine the real availability values. Thus, current real availability values may be provided on demand.

Figure 4:
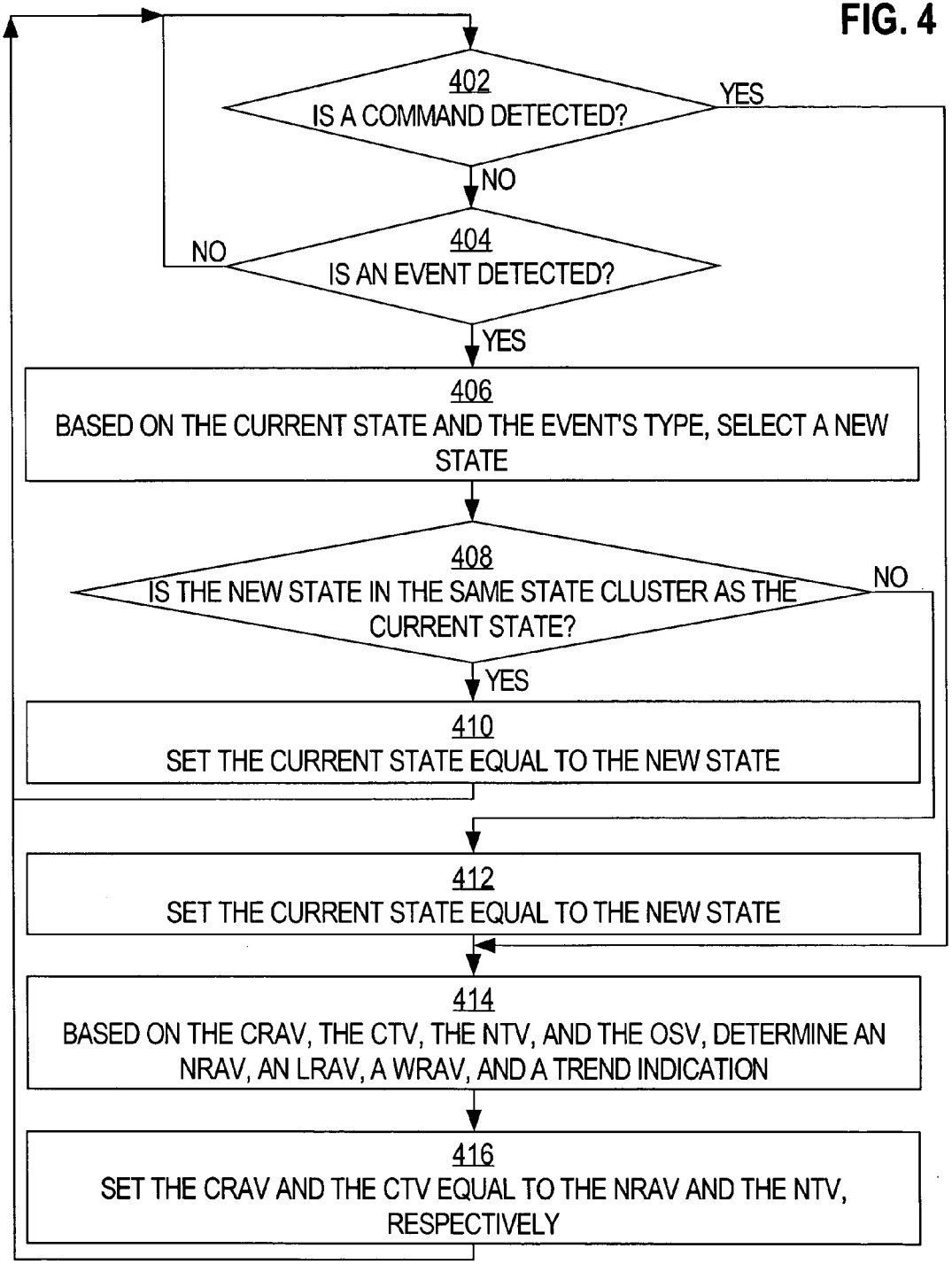
FIG. 4 is a flow diagram that illustrates a high level overview of one embodiment of a method for measuring the availability of a network element or service.

FIG. 4 is a flow diagram that illustrates a high level overview of one embodiment of a method for measuring the availability of a network element or service. In block 402, it is determined whether a command is detected. For example, network element 106A may determine whether managing system 102 has sent a command that instructs the network element to update the network element's real availability values. If a command is detected, then control passes to block 414. Otherwise, control passes to block 404.

In block 404, it is determined whether an event is detected. For example, network element 106A may determine whether an agent has sent an event. If an event is detected, then control passes to block 406. Otherwise, control passes back to block 402.

In block 406, based on a current state and the detected event's type, a new state is selected. For example, network element 106A may select the new state according to the states and event-triggered transitions shown in FIG. 3. For a more specific example, if a network element's current state is "operat" state 302 and the event is a "non-op" type of event, then "non-op" state 308 may be selected as the new state. Control then passes to block 408.

In block 408, it is determined whether the new state is in the same state cluster as the current state. For example, if the current state is "operat" state 302 in enabled state cluster 314, and the new state is "non-op" state 308 in disabled state cluster 316, then network element 106A may determine that the current state and the new state are in different state clusters. If the new state and the current state are in the same state cluster, then control passes to block 410. Otherwise, control passes to block 412.

In block 410, the current state is set equal to the new state. For example, if the new state is "shutting down" state 304, then the current state is set to "shutting down" state 304. In this example, because the new state and the current state were in the same state cluster, there was no transition between an enabled state and a disabled state. Therefore, the real availability values do not need to be updated in response to the determination, and control passes back to block 402.

Similarly, in block 412, the current state is set equal to the new state. However, because the new state and the current state were not in the same state cluster in this case, there was a transition between an enabled and a disabled state. Therefore, the real availability values are to be updated. Control passes to block 414.

In block 414, a new real availability value (NRAV), an LRAV, a WRAV, and a trend indicator are determined based at least in part on the CRAV, the CTV, a new time value (NTV), and the OSV. The NTV indicates the amount of time that has passed between the initialization of the network element and the moment at which the NRAV is determined. One embodiment of a process for determining the NRAV, LRAV, WRAV, and trend indicator is described below with reference to FIG. 5.

In block 416, the CRAV and the CTV are set equal to the NRAV and the NTV, respectively. Because the new real availability values can overwrite the former real availability values after the new real availability values are determined, storage requirements are reduced. Because the new real availability values replace the former real availability values, the method described above can be performed in a recursive manner to obtain fresh and accurate availability values on demand and in real time.

3.0 Implementation Example

A detailed example implementation of the foregoing general approaches is now described.

Figure 5:
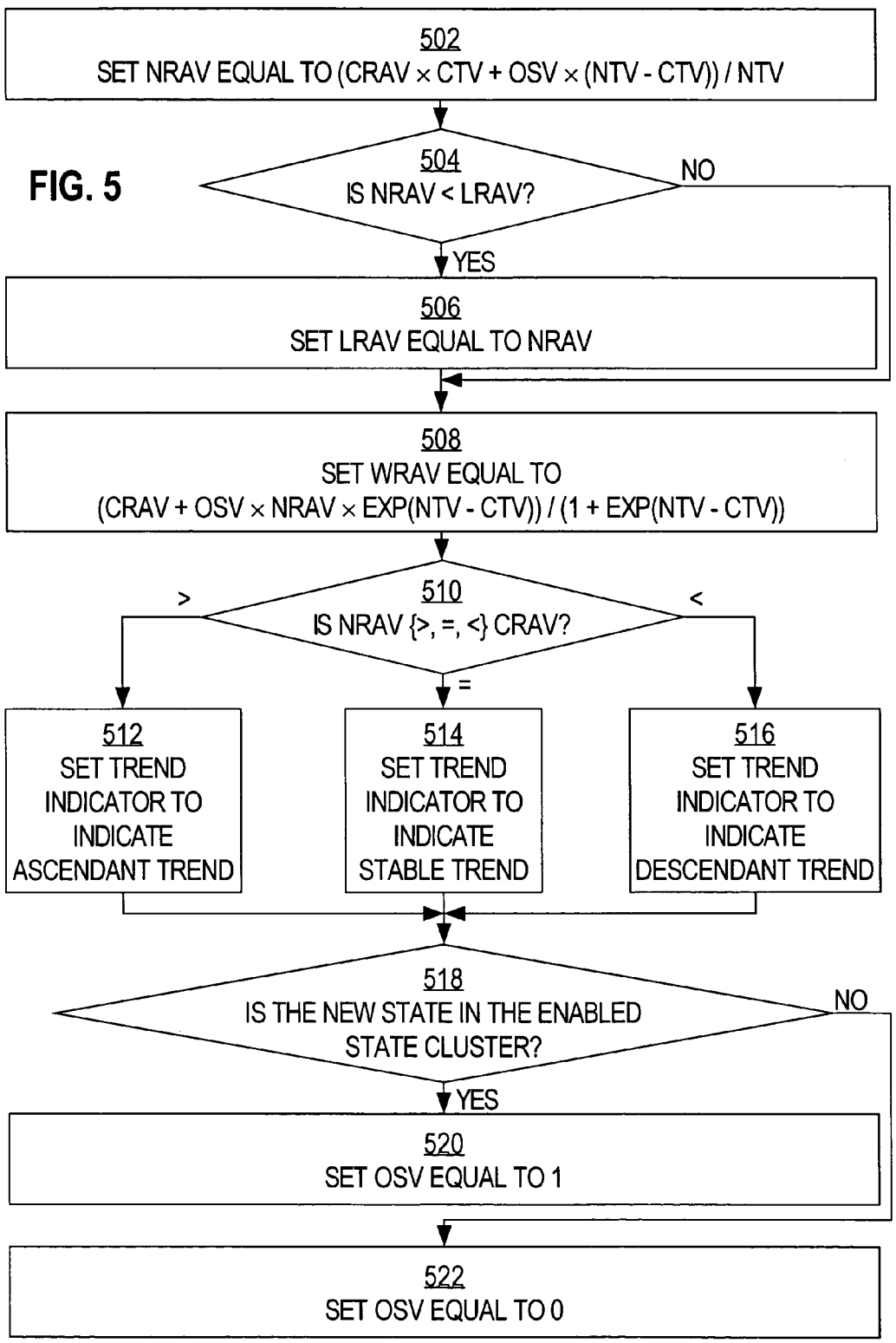
FIG. 5 is a flow diagram that illustrates the determination of the NRAV, the LRAV, the WRAV, and the trend indicator based on the CRAV, the CTV, the OSV, and the NTV.

FIG. 5 is a flow diagram that illustrates the determination of the NRAV, the LRAV, the WRAV, and the trend indicator based on the CRAV, the CTV, the OSV, and the NTV. In block 502, the NRAV is set equal to:

(CRAV·CTV+OSV·(NTV−CTV))/NTV.

For example, if the CRAV is "1" and the CTV is "5," then at 5 seconds after the network element's initialization, the network element's availability was 100%. If the NTV is "6" and the OSV is "0," then at 6 seconds after the network element's initialization, the network element is in a disabled state. Under these circumstances, calculating the NRAV according to the equation above yields an NRAV of 83%.

In block 504, it is determined whether the NRAV is less than the LRAV. If the NRAV is less than the LRAV, then control passes to block 506. Otherwise, control passes to block 508.

In block 506, the LRAV is set equal to the NRAV. Thus, the LRAV indicates the lowest recorded real availability value for the network element. Control passes to block 508.

In block 508, the WRAV is set equal to:

(CRAV+OSV·NRAV·EXP(NTV−CTV))/(1+EXP(NTV−CTV))

where EXP(NTV−CTV) is an exponential function of the difference between the NTV and the CTV. The evaluation of the exponential function yields a "weight value." By multiplying the NRAV by the weight value in the above equation, the NRAV is given greater weight than the CRAV, which was calculated at an earlier time.

In one embodiment, the exponential function returns a value that is also, or alternatively, based on other factors. For example, in one embodiment, the exponential function returns a value that is based on the type of event detected in block 404. In one embodiment, the exponential function returns a value that is based on a type of the network element or service for which the WRAV is to be determined.

Different types of network elements and services may be associated with different "confidence" indicators that indicate how accurately those types can measure availability. Thus, the exponential function may return a result that is based on the confidence indicator that is associated with the type of network element or service for which the WRAV is to be determined. As a result, a WRAV for a network element of a type associated with a high confidence indicator may be higher than a WRAV for a network element of type associated with a low confidence indicator.

In block 510, it is determined whether the NRAV is greater than, less than, or equal to the CRAV. If the NRAV is greater than the CRAV, then control passes to block 512. If the NRAV is equal to the CRAV, then control passes to block 514. If the NRAV is less than the CRAV, then control passes to block 516.

In block 512, due to the NRAV being greater than the CRAV, the trend indicator is set to indicate an ascendant trend. Control then passes to block 518.

In block 514, due to the NRAV being equal to the CRAV, the trend indicator is set to indicate a stable trend. Control then passes to block 518.

In block 516, due to the NRAV being less than the CRAV, the trend indicator is set to indicate a descendant trend. Control then passes to block 518.

In block 518, it is determined whether the new state, which was selected in block 406, is in the enabled state cluster (e.g., enabled state cluster 314). If the new state is in the enabled state cluster, then control passes to block 520. If the new state is in the disabled state cluster (e.g., disabled state cluster 316), then control passes to block 522.

In block 520, due to the new state being in the enabled state cluster, the OSV is set equal to "1," or another flag value. Alternatively, in block 522, due to the new state being in the disabled state cluster, the OSV is set equal to "0," or another flag value. Thus, the next time that the NRAV is determined, the OSV will correctly indicate whether the network element was, during the time interval prior to the determination, in an enabled or a disabled state.

The technique described above may be performed at multiple times in a recursive manner. As indicated in block 416 above, the CRAV and the CTV are set equal to the NRAV and the NTV, respectively. Therefore, each time that new real availability values are determined, the new real availability values are determined based on previously determined real availability values.

For example, in a first iteration of the above technique, when the NTV is "6," the NRAV may be determined to be "0.83." The CRAV is then set to "0.83," and the CTV is set to "6." Later, in a second iteration of the above technique, when the NTV is "7," the NRAV may be determined to be "0.85." The CRAV is then set to "0.85," and the CTV is set to "7." Still later, in a third iteration of the above technique, when the NTV is "10," the NRAV may be determined to be "0.6." The CRAV is then set to "0.6" and the CTV is set to "10." At each iteration, the OSV may be updated to indicate a transition between enabled and disabled states if such a transition occurred. Thus, a management system can ascertain, on demand, any network element's or service's current real availability.

4.0 Implementation Mechanisms—Hardware Overview

Figure 6:
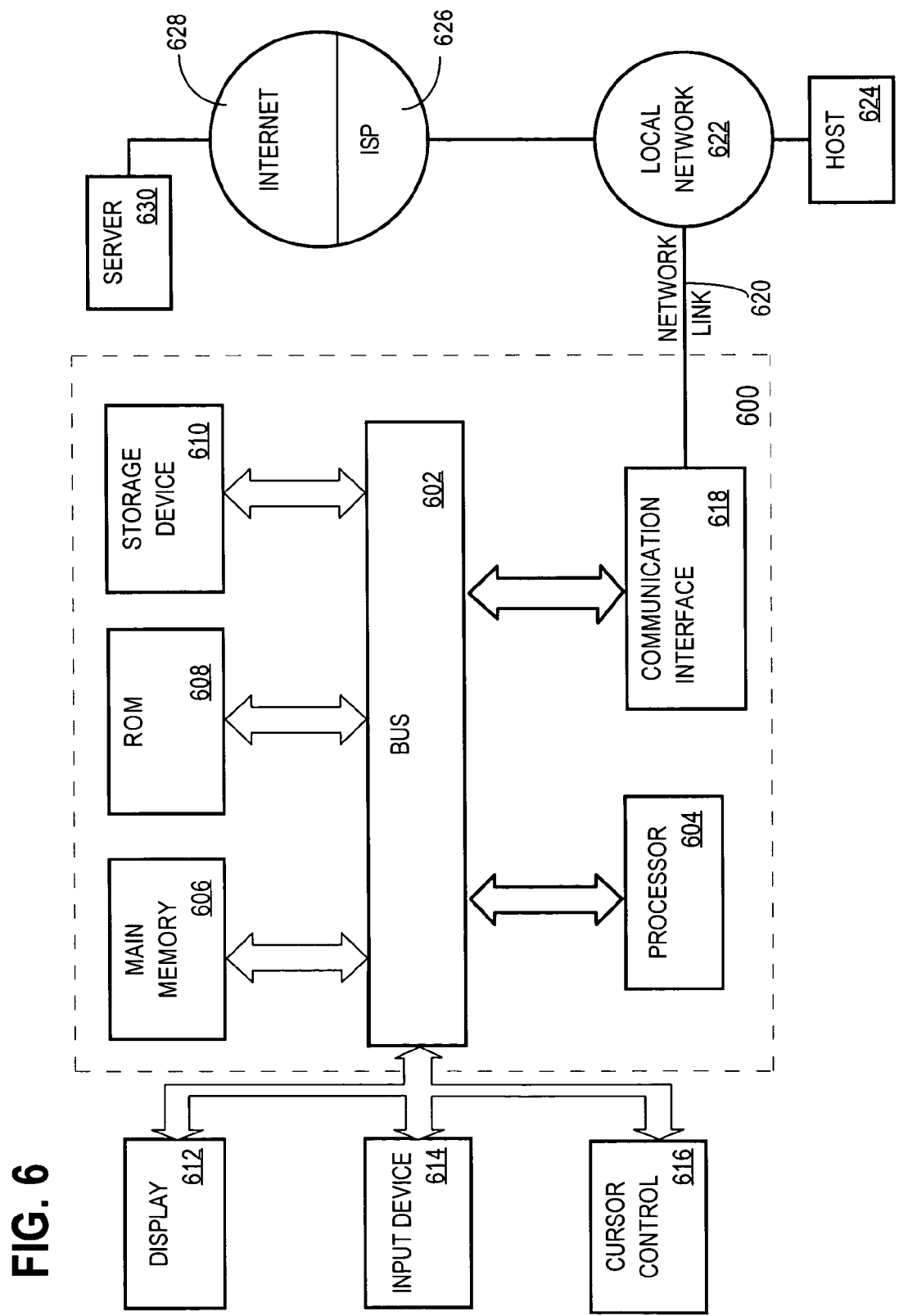
FIG. 6 is a block diagram that illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory ("RAM") or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory ("ROM") 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube ("CRT"), for displaying information to a computer user. An input device 614, including alphanumeric and other keys, is coupled to bus 602 for communicating information and command selections to processor 604. Another type of user input device is cursor control 616, such as a mouse, trackball, stylus, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for generating consistent user interfaces. According to one embodiment of the invention, generating consistent user interfaces is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network ("ISDN") card or a modem to provide a data communication connection to a corresponding type of telephone line. As another example, communication interface 618 may be a local area network ("LAN") card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider ("ISP") 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for generating consistent user interfaces as described herein.

The received code may be executed by processor 604 as it is received, and/or stored in storage device 610, or other non-volatile storage for later execution. In this manner, computer system 600 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of measuring availability of a network element, the method comprising the computer-implemented steps of:
    determining a second availability value based on a first availability value, a first time value, a second time value that differs from the first time value, and a first operational state value; and
    storing, in memory, the second availability value;

wherein determining the second availability value further comprises:
  determining a dividend based on the first availability value, the first time value, the second time value, and the first operational state value; and
  dividing the dividend by the second time value;
wherein the first availability value indicates the availability of the network element at the first time value;
wherein the second availability value indicates the availability of the network element at the second time value; and
wherein the first time value indicates a first time that is earlier than a second time indicated by the second time value;
wherein the method is performed by one or more computing devices.

2. A method as recited in claim 1, wherein determining the dividend further comprises the steps of:
  determining a first addend based on the first availability value and the first time value;
  determining a second addend based on the first operational state value, the second time value, and the first time value; and
  adding the first addend and the second addend.

3. A method as recited in claim 2, wherein determining the first addend further comprises multiplying the first availability value and the first time value.

4. A method as recited in claim 2, wherein determining the second addend further comprises the steps of:
  determining a multiplicand based on the second time value and the first time value; and
  multiplying the multiplicand and the first operational state value.

5. A method as recited in claim 4, wherein determining the multiplicand further comprises the step of subtracting the first time value from the second time value.

6. A method as recited in claim 1, further comprising the steps of:
  determining a third availability value based on the second availability value, the second time value, a third time value that differs from the second time value, and a second operational state value; and
  storing the third availability value.

7. A method as recited in claim 1, wherein determining the second availability value further comprises the steps of:
  detecting a command; and
  in response to detecting the command, determining a third availability value based on the second availability value, the second time value, a third time value that differs from the second time value, and a second operational state value.

8. A method as recited in claim 1, further comprising the steps of:
  detecting an event while a current state is a first state that is in a first state cluster;
  in response to detecting the event, selecting, based on the current state and a type of the event, a second state that is in a second state cluster;
  determining whether the first state and the second state are in different state clusters; and
  in response to determining that the first state and the second state are in different state clusters, determining a third availability value based on the second availability value, the second time value, a third time value that differs from the second time value, and a second operational state value that differs from the first operational state value.

9. A method as recited in claim 1, further comprising the steps of:
  determining whether the second availability value is less than a lowest recorded availability value; and
  if the second availability value is less than the lowest recorded availability value, then storing the second availability value as the lowest recorded availability value.

10. A method as recited in claim 1, further comprising the steps of:
  comparing the second availability value with the first availability value;
  based on the comparing, selecting, from among a plurality of trend indicators, a particular trend indicator; and
  storing the particular trend indicator.

11. A method as recited in claim 10, wherein selecting the particular trend indicator further comprises the steps of:
  selecting a first trend indicator if the first availability value is less than the second availability value;
  selecting a second trend indicator if the first availability value is equal to the second availability value; and
  selecting a third trend indicator if the first availability value is greater than the second availability value;
  wherein the first, second, and third trend indicators differ from each other.

12. A method of measuring availability of a network element, the method comprising the computer-implemented steps of:
  determining a second availability value based on a first availability value, a first time value, a second time value that differs from the first time value, and a first operational state value;
  storing, in memory, the second availability value;
  determining a third availability value based on the first availability value, the second availability value, and a weight value; and
  storing, in the memory, the third availability value;
  wherein the first availability value indicates the availability of the network element at the first time value;
  wherein the second availability value indicates the availability of the network element at the second time value;
  wherein the third availability value indicates the availability of the network element at the third time value;
  wherein the first time value indicates a first time that is earlier than a second time indicated by the second time value; and
  wherein the second time is earlier than a third time indicated by the third time value;
  wherein the method is performed by one or more computing devices.

13. A method as recited in claim 12, wherein determining the third availability value further comprises the steps of:
  determining a dividend based on the first availability value, the second availability value, and the weight value;
  determining a divisor based on the weight value; and
  dividing the dividend by the divisor.

14. A method as recited in claim 13, wherein determining the dividend further comprises the steps of:
  determining an addend based on the second availability value and the weight value; and;
  adding the addend and the first availability value.

15. A method as recited in claim 14, wherein determining the addend further comprises the step of multiplying the second availability value and the weight value.

16. A method as recited in claim 12, further comprising the step of:
   determining the weight value based on the difference between the first time value and the second time value.

17. A method as recited in claim 12, further comprising the step of:
   determining the weight value based on a type of event.

18. A method as recited in claim 12, further comprising the step of:
   determining the weight value based on a type of the network element.

19. A method of measuring availability of a network element, the method comprising the computer-implemented steps of:
   detecting an event while a current state is a first state that is in a first state cluster;
   in response to detecting the event, selecting, based on the current state and a type of the event, a second state that is in a second state cluster;
   determining whether the first state and the second state are in different state clusters; and
   in response to determining that the first state and the second state are in different state clusters, performing the steps of:
      multiplying a current availability value and a current time value to produce a first addend;
      subtracting the current time value from a new time value to produce a multiplicand;
      multiplying the multiplicand and an operational state value to produce a second addend;
      adding the first addend and the second addend to produce a dividend;
      dividing the dividend by the new time value to produce a new availability value;
      setting the current availability value equal to the new availability value;
      setting the current time value equal to the new time value; and
      storing, in memory, the new availability value;
   wherein the current availability value indicates the availability of the network element at the current time value;
   wherein the new availability value indicates the availability of the network element at the new time value; and
   wherein the current time value indicates a first time that is earlier than a second time indicated by the new time value;
   wherein the method is performed by one or more computing devices.

20. A method as recited in claim 19, wherein the new time value is equal to the amount of time between an initializing of the network element and the detecting of the event.

21. A method as recited in claim 19, further comprising the step of determining the operational state value based on which particular state cluster among a plurality of state clusters contains the first state.

22. A method as recited in claim 19, further comprising the step of setting the current state equal to the second state.

23. A computer-readable storage medium storing one or more sequences of instructions for measuring availability of a network element, which instructions, when executed by one or more processors, cause the one or more processors to carry out the steps of:
   determining a second availability value based on a first availability value, a first time value, a second time value that differs from the first time value, and a first operational state value; and
   storing, in memory, the second availability value;
   wherein determining the second availability value further comprises:
      determining a dividend based on the first availability value, the first time value, the second time value, and the first operational state value; and
      dividing the dividend by the second time value;
   wherein the first availability value indicates the availability of the network element at the first time value;
   wherein the second availability value indicates the availability of the network element at the second time value; and
   wherein the first time value indicates a first time that is earlier than a second time indicated by the second time value.

24. A computer-readable storage medium as recited in claim 23, wherein determining the dividend further comprises the steps of:
   determining a first addend based on the first availability value and the first time value;
   determining a second addend based on the first operational state value, the second time value, and the first time value; and
   adding the first addend and the second addend.

25. A computer-readable storage medium as recited in claim 24, wherein determining the first addend further comprises multiplying the first availability value and the first time value.

26. A computer-readable storage medium as recited in claim 24, wherein determining the second addend further comprises the steps of:
   determining a multiplicand based on the second time value and the first time value; and
   multiplying the multiplicand and the first operational state value.

27. A computer-readable storage medium as recited in claim 26, wherein determining the multiplicand further comprises the step of subtracting the first time value from the second time value.

28. A computer-readable storage medium as recited in claim 23, further comprising instructions for performing the steps of:
   determining a third availability value based on the second availability value, the second time value, a third time value that differs from the second time value, and a second operational state value; and
   storing the third availability value.

29. A computer-readable storage medium as recited in claim 23, wherein determining the second availability value further comprises the steps of:
   detecting a command; and
   in response to detecting the command, determining a third availability value based on the second availability value, the second time value, a third time value that differs from the second time value, and a second operational state value.

30. A computer-readable storage medium as recited in claim 23, further comprising instructions for performing the steps of:
   detecting an event while a current state is a first state that is in a first state cluster;

in response to detecting the event, selecting, based on the current state and a type of the event, a second state that is in a second state cluster;

determining whether the first state and the second state are in different state clusters; and in response to determining that the first state and the second state are in different state clusters, determining a third availability value based on the second availability value, the second time value, a third time value that differs from the second time value, and a second operational state value that differs from the first operational state value.

31. A computer-readable storage medium as recited in claim 23, further comprising instructions for performing the steps of:

determining whether the second availability value is less than a lowest recorded availability value; and if the second availability value is less than the lowest recorded availability value, then storing the second availability value as the lowest recorded availability value.

32. A computer-readable storage medium as recited in claim 23, further comprising instructions for performing the steps of:

comparing the second availability value with the first availability value;

based on the comparing, selecting, from among a plurality of trend indicators, a particular trend indicator; and storing the particular trend indicator.

33. A computer-readable storage medium as recited in claim 32, wherein selecting the particular trend indicator further comprises the steps of:

selecting a first trend indicator if the first availability value is less than the second availability value;

selecting a second trend indicator if the first availability value is equal to the second availability value; and selecting a third trend indicator if the first availability value is greater than the second availability value;

wherein the first, second, and third trend indicators differ from each other.

34. A computer-readable storage medium storing one or more sequences of instructions for measuring availability of a network element, which instructions, when executed by one or more processors, cause the one or more processors to carry out:

determining a second availability value based on a first availability value, a first time value, a second time value that differs from the first time value, and a first operational state value;

storing, in memory, the second availability value;

determining a third availability value based on the first availability value, the second availability value, and a weight value; and storing, in the memory, the third availability value;

wherein the first availability value indicates the availability of the network element at the first time value;

wherein the at the second time value;

wherein the third availability value indicates the availability of the network element at the third time value;

wherein the first time value indicates a first time that is earlier than a second time indicated by the second time value; and wherein the second time is earlier than a third time indicated by the third time value.

35. A computer-readable storage medium as recited in claim 34, wherein determining the third availability value further comprises the steps of:

determining a dividend based on the first availability value, the second availability value, and the weight value;

determining a divisor based on the weight value; and dividing the dividend by the divisor.

36. A computer-readable storage medium as recited in claim 35, wherein determining the dividend further comprises the steps of:

determining an addend based on the second availability value and the weight value; and;

adding the addend and the first availability value.

37. A computer-readable storage medium as recited in claim 36, wherein determining the addend further comprises the step of multiplying the second availability value and the weight value.

38. A computer-readable storage medium as recited in claim 34, further comprising instructions for performing the step of:

determining the weight value based on the difference between the first time value and the second time value.

39. A computer-readable storage medium as recited in claim 34, further comprising instructions for performing the step of:

determining the weight value based on a type of event.

40. A computer-readable storage medium as recited in claim 34, further comprising instructions for performing the step of:

determining the weight value based on a type of the network element.

41. An apparatus for measuring availability of a network element, comprising:

one or more processors;

means for determining a second availability value based on a first availability value, a first time value, a second time value that differs from the first time value, and a first operational state value; and means for storing, in memory, the second availability value;

wherein the means for determining the second availability value further comprises:

means for determining a dividend based on the first availability value, the first time value, the second time value, and the first operational state value; and means for dividing the dividend by the second time value;

wherein the first availability value indicates the availability of the network element at the first time value;

wherein the second availability value indicates the availability of the network element at the second time value; and wherein the first time value indicates a first time that is earlier than a second time indicated by the second time value.

42. An apparatus for measuring availability of a network element, comprising:

a network interface that is coupled to a data network for receiving one or more packet flows therefrom;

a processor;

one or more stored sequences of instructions which, when executed by the processor, cause the processor to carry out the steps of:

determining a second availability value based on a first availability value, a first time value, a second time value that differs from the first time value, and a first operational state value; and storing, in memory, the second availability value;

wherein determining the second availability value further comprises the steps of:
determining a dividend based on the first availability value, the first time value, the second time value, and the first operational state value; and
dividing the dividend by the second time value;
wherein the first availability value indicates the availability of the network element at the first time value;
wherein the second availability value indicates the availability of the network element at the second time value; and
wherein the first time value indicates a first time that is earlier than a second time indicated by the second time value.

43. An apparatus as recited in claim 42, wherein the one or more stored sequences of instructions further comprises instructions which, when executed by the processor, cause the processor to carry out:
determining a third availability value based on the second availability value, the second time value, a third time value that differs from the second time value, and a second operational state value; and
storing the third availability value.

44. An apparatus as recited in claim 42, wherein determining the second availability value further comprises:
detecting a command; and
in response to detecting the command, determining a third availability value based on the second availability value, the second time value, a third time value that differs from the second time value, and a second operational state value.

45. An apparatus as recited in claim 42, wherein the one or more stored sequences of instructions further comprises instructions which, when executed by the processor, cause the processor to carry out:
detecting an event while a current state is a first state that is in a first state cluster;
in response to detecting the event, selecting, based on the current state and a type of the event, a second state that is in a second state cluster;
determining whether the first state and the second state are in different state clusters; and
in response to determining that the first state and the second state are in different state clusters, determining a third availability value based on the second availability value, the second time value, a third time value that differs from the second time value, and a second operational state value that differs from the first operational state value.

46. An apparatus as recited in claim 42, wherein the one or more stored sequences of instructions further comprises instructions which, when executed by the processor, cause the processor to carry out:
determining whether the second availability value is less than a lowest recorded availability value; and
if the second availability value is less than the lowest recorded availability value, then storing the second availability value as the lowest recorded availability value.

47. An apparatus as recited in claim 42, wherein the one or more stored sequences of instructions further comprises instructions which, when executed by the processor, cause the processor to carry out:
comparing the second availability value with the first availability value;
based on the comparing, selecting, from among a plurality of trend indicators, a particular trend indicator; and
storing the particular trend indicator.

48. An apparatus as recited in claim 42, wherein selecting the particular trend indicator further comprises:
selecting a first trend indicator if the first availability value is less than the second availability value;
selecting a second trend indicator if the first availability value is equal to the second availability value; and
selecting a third trend indicator if the first availability value is greater than the second availability value;
wherein the first, second, and third trend indicators differ from each other.

49. An apparatus for measuring availability of a network element, comprising:
a network interface that is coupled to a data network for receiving one or more packet flows therefrom;
a processor;
one or more stored sequences of instructions which, when executed by the processor, cause the processor to carry out:
determining a second availability value based on a first availability value, a first time value, a second time value that differs from the first time value, and a first operational state value;
storing, in memory, the second availability value;
determining a third availability value based on the first availability value, the second availability value, and a weight value; and
storing, in the memory, the third availability value;
wherein the first availability value indicates the availability of the network element at the first time value;
wherein the second availability value indicates the availability of the network element at the second time value;
wherein the third availability value indicates the availability of the network element at the third time value;
wherein the first time value indicates a first time that is earlier than a second time indicated by the second time value; and
wherein the second time is earlier than a third time indicated by the third time value.

50. An apparatus for measuring availability of a network element, comprising:
a network interface that is coupled to a data network for receiving one or more packet flows therefrom;
a processor;
one or more stored sequences of instructions which, when executed by the processor, cause the processor to carry out:
detecting an event while a current state is a first state that is in a first state cluster;
in response to detecting the event, selecting, based on the current state and a type of the event, a second state that is in a second state cluster;
determining whether the first state and the second state are in different state clusters; and
in response to determining that the first state and the second state are in different state clusters, performing:
multiplying a current availability value and a current time value to produce a first addend;
subtracting the current time value from a new time value to produce a multiplicand;
multiplying the multiplicand and an operational state value to produce a second addend;
adding the first addend and the second addend to produce a dividend;

dividing the dividend by the new time value to produce a new availability value;
setting the current availability value equal to the new availability value;
setting the current time value equal to the new time value; and
storing, in memory, the new availability value;
wherein the current availability value indicates the availability of the network element at the current time value;
wherein the new availability value indicates the availability of the network element at the new time value; and
wherein the current time value indicates a first time that is earlier than a second time indicated by the new time value.

51. An apparatus for measuring availability of a network element, comprising:
one or more processors;
means for detecting an event while a current state is a first state that is in a first state cluster;
means for selecting, in response to detecting the event, based on the current state and a type of the event, a second state that is in a second state cluster;
means for determining whether the first state and the second state are in different state clusters;
means for multiplying a current availability value and a current time value to produce a first addend;
means for subtracting the current time value from a new time value to produce a multiplicand;
means for multiplying the multiplicand and an operational state value to produce a second addend;
means for adding the first addend and the second addend to produce a dividend;
means for dividing the dividend by the new time value to produce a new availability value;
means for setting the current availability value equal to the new availability value;
means for setting the current time value equal to the new time value; and
means for storing, in memory, the new availability value;
wherein the current availability value indicates the availability of the network element at the current time value;
wherein the new availability value indicates the availability of the network element at the new time value; and
wherein the current time value indicates a first time that is earlier than a second time indicated by the new time value.

52. An apparatus for measuring availability of a network element, comprising:
one or more processors;
means for determining a second availability value based on a first availability value, a first time value, a second time value that differs from the first time value, and a first operational state value;
means for storing the second availability value;
means for determining a third availability value based on the first availability value, the second availability value, and a weight value; and
means for storing, in memory, the third availability value;
wherein the first availability value indicates the availability of the network element at the first time value;
wherein the second availability value indicates the availability of the network element at the second time value;
wherein the third availability value indicates the availability of the network element at the third time value;
wherein the first time value indicates a first time that is earlier than a second time indicated by the second time value; and
wherein the second time is earlier than a third time indicated by the third time value.

* * * * *

UNITED STATES PATENT AND TRADEMARK OFFICE
CERTIFICATE OF CORRECTION

PATENT NO.        : 7,620,714 B1                                   Page 1 of 1
APPLICATION NO.   : 10/714192
DATED             : November 17, 2009
INVENTOR(S)       : Dini et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1350 days.

Signed and Sealed this

Fourteenth Day of December, 2010

David J. Kappos
*Director of the United States Patent and Trademark Office*